United States Patent
Konishi et al.

(10) Patent No.: US 10,826,054 B2
(45) Date of Patent: Nov. 3, 2020

(54) POSITIVE ELECTRODE FOR LITHIUM ION SECONDARY BATTERY, GRAPHENE/POSITIVE ELECTRODE ACTIVE MATERIAL COMPOSITE PARTICLES, MANUFACTURING METHODS FOR SAME, AND POSITIVE ELECTRODE PASTE FOR LITHIUM ION SECONDARY BATTERY

(71) Applicant: TORAY INDUSTRIES, INC., Tokyo (JP)

(72) Inventors: Takashi Konishi, Otsu (JP); Eiichiro Tamaki, Otsu (JP); Manabu Kawasaki, Otsu (JP); Koki Miyazono, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 205 days.

(21) Appl. No.: 15/763,480

(22) PCT Filed: Sep. 29, 2016

(86) PCT No.: PCT/JP2016/078811
§ 371 (c)(1),
(2) Date: Mar. 27, 2018

(87) PCT Pub. No.: WO2017/061323
PCT Pub. Date: Apr. 13, 2017

(65) Prior Publication Data
US 2018/0277829 A1     Sep. 27, 2018

(30) Foreign Application Priority Data
Oct. 5, 2015   (JP) ................. 2015-197354

(51) Int. Cl.
*H01M 4/131*   (2010.01)
*H01M 4/525*   (2010.01)
(Continued)

(52) U.S. Cl.
CPC ............. *H01M 4/131* (2013.01); *H01M 4/13* (2013.01); *H01M 4/133* (2013.01); *H01M 4/139* (2013.01);
(Continued)

(58) Field of Classification Search
CPC .......... H01M 4/36; H01M 4/58; H01M 4/583; H01M 4/625; H01M 4/1397;
(Continued)

(56) References Cited

U.S. PATENT DOCUMENTS

2011/0292570 A1 * 12/2011 Ivanovici ............... B82Y 30/00
                                                             361/502
2012/0088156 A1 *  4/2012 Nomoto ................ H01M 4/366
                                                             429/221
(Continued)

FOREIGN PATENT DOCUMENTS

CN    102013477 A    4/2011
JP    2002367610 A  12/2002
(Continued)

OTHER PUBLICATIONS

Luo et. al., J. Mater. Chem, 2014,2,4997 (Year: 2014).*
(Continued)

*Primary Examiner* — Alexander Usyatinsky
(74) *Attorney, Agent, or Firm* — RatnerPrestia

(57) ABSTRACT

An object of the present invention is to improve the electron conductivity and ion conductivity of the surface of a positive electrode active material to provide a lithium ion battery having high capacity and high output. The present invention relates to a positive electrode for a lithium ion secondary
(Continued)

battery, including a mixture layer containing a positive electrode active material for a lithium ion secondary battery and graphene, wherein the mixture layer has a percentage of abundance of silicon composing a siloxane bond in total elements of 0.4 atomic % or more as measured by X-ray photoelectron spectroscopy.

15 Claims, 2 Drawing Sheets

(51) Int. Cl.
    *H01M 4/13*     (2010.01)
    *H01M 4/36*     (2006.01)
    *H01M 4/139*     (2010.01)
    *H01M 4/62*     (2006.01)
    *H01M 4/133*     (2010.01)
    *H01M 4/1391*     (2010.01)
    *H01M 4/505*     (2010.01)
    *H01M 10/0525*     (2010.01)

(52) U.S. Cl.
    CPC ........... *H01M 4/1391* (2013.01); *H01M 4/36* (2013.01); *H01M 4/366* (2013.01); *H01M 4/505* (2013.01); *H01M 4/525* (2013.01); *H01M 4/62* (2013.01); *H01M 4/625* (2013.01); *H01M 10/0525* (2013.01)

(58) Field of Classification Search
    CPC .. H01M 4/0471; H01M 4/0433; H01M 4/366; H01M 4/38; H01M 4/5825; H01M 2004/028; H01M 4/136; Y02P 70/54; Y02E 60/122
See application file for complete search history.

(56) References Cited

U.S. PATENT DOCUMENTS

| | | | |
|---|---|---|---|
| 2013/0302693 A1* | 11/2013 | Sun | H01M 4/00 429/231.8 |
| 2015/0140438 A1* | 5/2015 | Sun | C01B 32/192 429/231.95 |

FOREIGN PATENT DOCUMENTS

| | | |
|---|---|---|
| JP | 2012099467 A | 5/2012 |
| JP | 2013538933 A | 10/2013 |
| KR | 20150060467 A | 6/2015 |

OTHER PUBLICATIONS

2016560594,Decision_to_Grant_a_Patent_(TRANSLATED), dated Jun. 16, 2020 (Year: 2020).*

Luo, W.B., et al., "Self-assembled graphene and $LiFePO_4$ composites with superior high rate capability for lithium ion batteries," Journal of Materials Chemistry A, 2014, vol. 2, pp. 4927-4931.

Extended European Search Report for European Application No. 16 853 477.4, dated Feb. 22, 2019, 10 pages.

International Search Report and Written Opinion for International Application No. PCT/JP2016/078811, dated Nov. 22, 2016, 10 pages.

* cited by examiner

POSITIVE ELECTRODE FOR LITHIUM ION SECONDARY BATTERY, GRAPHENE/POSITIVE ELECTRODE ACTIVE MATERIAL COMPOSITE PARTICLES, MANUFACTURING METHODS FOR SAME, AND POSITIVE ELECTRODE PASTE FOR LITHIUM ION SECONDARY BATTERY

CROSS REFERENCE TO RELATED APPLICATIONS

This is the U.S. National Phase application of PCT/JP2016/078811, filed Sep. 29, 2016, which claims priority to Japanese Patent Application No. 2015-197354, filed Oct. 5, 2015, the disclosures of these applications being incorporated herein by reference in their entireties for all purposes.

TECHNICAL FIELD OF THE INVENTION

The present invention relates to a positive electrode for a lithium ion secondary battery, graphene/positive electrode active material composite particles, methods for manufacturing the same, and a positive electrode paste for a lithium ion secondary battery used in the manufacturing methods.

BACKGROUND OF THE INVENTION

A lithium ion secondary battery is formed by arranging at least a positive electrode and a negative electrode each having an active material that allows reversible insertion and extraction of lithium ions, and a separator that separates the positive electrode and the negative electrode from each other in a container, and filling the container with a nonaqueous electrolytic solution.

The positive electrode is formed by applying a positive electrode paste containing a positive electrode active material for a lithium battery, a conductive additive, and a binder to a metal foil current collector made of aluminum or the like. As the positive electrode active material, powders of composite oxides of lithium and transition metals (hereinafter sometimes referred to as lithium metal oxides), such as lithium manganate having a spinel structure ($LiMn_2O_4$), lithium manganate having a rock salt structure ($LiMnO_2$), lithium cobaltate ($LiCoO_2$), lithium nickelate ($LiNiO_2$), a ternary system in which nickel is partially substituted with manganese and cobalt ($LiNi_xMn_yCo_{1-x-y}O_2$), and a ternary system in which nickel is partially substituted with cobalt and aluminum ($LiNi_xCo_yAl_{1-x-y}O_2$) are currently often used.

Meanwhile, similarly to the positive electrode, the negative electrode is formed by applying an electrode material containing an active material, a conductive additive, and a binder to a metal foil current collector made of copper or the like. In general, as the negative electrode active material, the following materials are used: lithium metal and lithium alloys such as Li—Al alloy and Li—Sn, silicon compounds containing SiO, SiC, SiOC or the like as basic constituent elements, conductive polymers doped with lithium, such as polyacetylene and polypyrrole, interlayer compounds incorporating lithium ions in the crystals, and carbon materials such as natural graphite, artificial graphite, and hard carbon.

In the active materials currently in practical use, the theoretical capacity of the positive electrode active material is far lower than the theoretical capacity of the negative electrode active material. Therefore, in order to realize high capacity and high output of a lithium ion battery, the positive electrode is required to have high electron conductivity and high ion conductivity.

Therefore, in order to improve the electron conductivity in the positive electrode, a technique of adding a carbon material as a conductive additive to the electrode is employed. As the carbon material, graphite, acetylene black, Ketjen black and the like have been used. In recent years, use of graphene as a conductive additive has also been reported.

Patent Document 1 and Non-Patent Document 1 disclose a technique of mixing graphene oxide with a positive electrode active material, and then reducing the resulting mixture. Patent Document 2 discloses a method of coating a positive electrode active material with an alkoxysilane and a conductive agent.

PATENT DOCUMENTS

Patent Document 1: Japanese Patent Laid-open Publication. No. 2012-99467
Patent Document 2: Japanese Patent Laid-open Publication No. 2002-367610

NON-PATENT DOCUMENT

Non-Patent Document 1: Qin Z., et al. Journal of Materials Chemistry, 2011, 22, 21144

SUMMARY OF THE INVENTION

In Patent Document 1 and Non-Patent Document 1, graphene oxide is mixed with a positive electrode active material in a ball mill, and then the resulting mixture is reduced to give a composite. Since the positive electrode active material and graphene adhere to each other merely physically, they may be easily separated from each other, so that the electron conductivity of the surface of the positive electrode active material may be lowered to increase the surface resistance of the positive electrode active material. Moreover, since the mixture is heated at a high temperature of 500° C. to 800° C. in a reducing atmosphere or an inert atmosphere in both the cases, the positive electrode active material itself can also be reduced. Therefore, usable positive electrode active materials are limited to lithium iron phosphate, lithium nickel phosphate, lithium cobalt phosphate, lithium manganese phosphate, and the like.

In Patent Document 2, the positive electrode active material is coated with an alkoxysilane and carbon black. Although the silanol groups produced after the hydrolysis of the alkoxysilane undergo dehydration condensation with hydroxy groups on the surface of the positive electrode active material to form a siloxane bond, carbon black and the alkoxysilane hardly form bonds since carbon black has extremely few hydroxy groups. In other words, since the bond between the positive electrode active material and carbon black is weak, there is a limit on the reduction in resistance. In addition, since carbon black has a structure in which spherical particles are linked together, carbon black is in point contact with the positive electrode active material. Thus, if the electrode density is low, electron conduction of the surface of the positive electrode active material is deteriorated to increase the surface resistance of the positive electrode active material.

An object of the present invention is to improve, by a strong bond between the positive electrode active material and graphene via surface contact, the electron conduction and ion conductivity of the surface of a positive electrode active material to provide a lithium ion battery having high capacity and high output.

The present invention provides, for solving the above-mentioned problems, a positive electrode for a lithium ion secondary battery, including a mixture layer containing a positive electrode active material for a lithium ion secondary battery and graphene, wherein the mixture layer has a percentage of abundance of silicon composing a siloxane bond in total elements of 0.4 atomic % or more as measured by X-ray photoelectron spectroscopy.

The present invention also provides a method for manufacturing a positive electrode for a lithium ion secondary battery, including, in the following order, the steps of: treating a positive electrode active material for a lithium ion secondary battery with a silane coupling agent; and mixing, with graphene or graphene oxide, the positive electrode active material for a lithium ion secondary battery treated with the silane coupling agent.

The present invention also provides graphene/positive electrode active material composite particles, containing a composite of a positive electrode active material for a lithium ion secondary battery with graphene, having a percentage of abundance of silicon composing a siloxane bond in total elements of 0.4 atomic % or more as measured by X-ray photoelectron spectroscopy.

The present invention also provides a method for manufacturing graphene/positive electrode active material composite particles, including, in the following order, the steps of: treating a positive electrode active material for a lithium ion secondary battery with a silane coupling agent; and making a composite of the positive electrode active material fora lithium ion secondary battery treated with the silane coupling agent with graphene or graphene oxide.

In addition, the present invention provides a positive electrode paste for a lithium ion secondary battery, containing: a positive electrode active material for a lithium ion secondary battery, graphene or graphene oxide, and a silane coupling agent.

The positive electrode for a lithium ion secondary battery of the present invention, a positive electrode for a lithium ion secondary battery manufactured by the method for manufacturing a positive electrode for a lithium ion secondary battery of the present invention, the graphene/positive electrode active material composite particles of the present invention, graphene/positive electrode active material composite particles manufactured by the method for manufacturing graphene/positive electrode active material composite particles of the present invention, and a positive electrode for a lithium ion secondary battery manufactured using the positive electrode paste for a lithium ion secondary battery of the present invention have both high electron conductivity and high ion conductivity. Use of such a positive electrode for a lithium ion secondary battery of the present invention can provide a lithium ion secondary battery having high capacity and high output.

DETAILED DESCRIPTION OF CERTAIN EMBODIMENTS OF THE INVENTION

Figure 1:
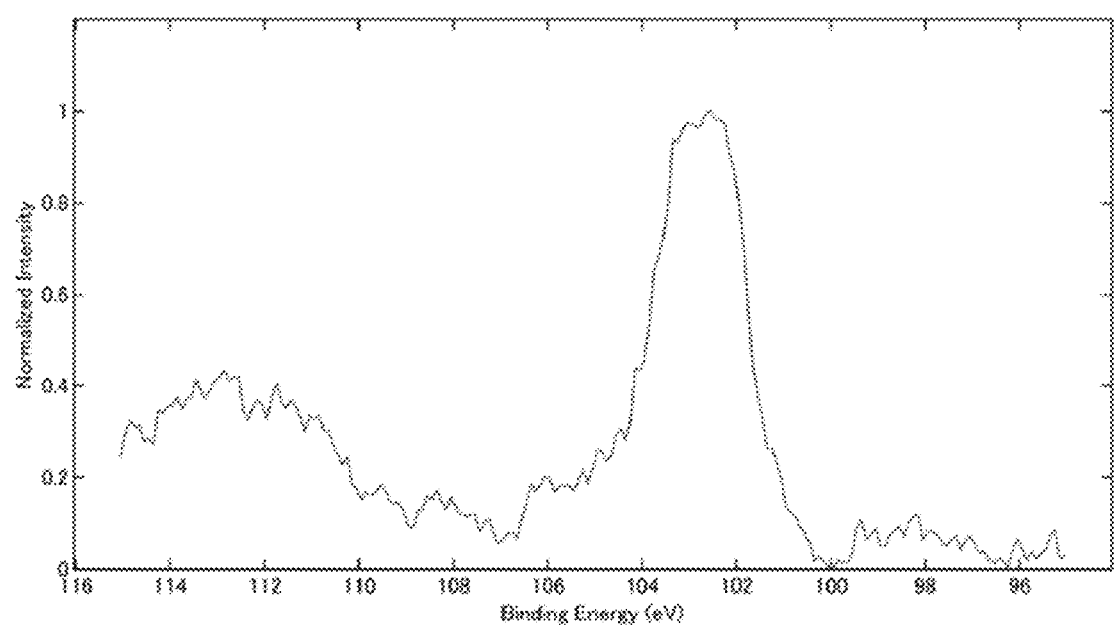
FIG. 1 is a diagram showing X-ray photoelectron spectroscopy results of a positive electrode for a lithium ion secondary battery produced in Example 1.

<Positive Electrode for Lithium Ion Secondary Battery>

The positive electrode for a lithium ion secondary battery (hereinafter sometimes simply referred to as a "positive electrode") of the present invention includes a mixture layer containing a positive electrode active material for a lithium ion secondary battery (hereinafter sometimes simply referred to as a "positive electrode active material" or an "active material") and graphene.

The positive electrode active material for a lithium ion battery in the present invention is not particularly limited. As the positive electrode active material, metal oxide active materials such as lithium manganate having a spinel structure ($LiMn_2O_4$), lithiummanganate having a rock salt structure ($LiMnO_2$), lithium cobaltate ($LiCoO_2$), lithium nickelate ($LiNiO_2$), a ternary system in which nickel is partially substituted with manganese and cobalt ($LiNi_xMn_yCo_{1-x-y}O_2$), a ternary system in which nickel is partially substituted with cobalt and aluminum ($LiNi_xCo_yAl_{1-x-y}O_2$) and $V_2O_5$, metal compound active materials such as $TiS_2$, $MoS_2$, and $NbSe_2$, lithium iron phosphate ($LiFePO_4$) and lithium manganese phosphate ($LiMnPO_4$) having an olivine structure, and solid solution active materials can be used.

In particular, positive electrode active materials containing at least lithium and nickel, such as lithium nickelate and ternary positive electrode active materials, have a feature that they easily form a siloxane bond described later because they have many hydroxy groups on their surfaces. Therefore, such positive electrode active materials are preferable because they can have a good battery performance improvement effect by the configuration of the present invention.

Further, unlike other conductive additives, graphene has a sheet-like two-dimensional shape. Therefore, graphene can come into surface contact with the positive electrode active material, and tends to coat the positive electrode active material while following the uneven shape of the surface of the positive electrode active material. Thus, especially when a positive electrode active material in the form of a granulated body is used, the effect of the present invention is remarkably exhibited. A granulated body means particles obtained by granulating a slurry in which a powder is dispersed into spheres by spray drying or the like. Examples of the positive electrode active material used as a granulated body include a ternary system ($LiNi_xMn_yCo_{1-x-y}O_2$) and $LiNi_xCo_yAl_{1-x-y}O_2$. Since primary particles are aggregated to form secondary particles in the granulated body, the shape of the granulated body surface tends to be uneven, and the area of the surface where the positive electrode active material comes into contact with the conductive additive has to be increased. Thus, the effect of the present invention is remarkably exhibited.

In addition, when the particle diameter of the positive electrode active material is small, the specific surface area of the positive electrode active material is large, and the area of the surface where the positive electrode active material comes into contact with the conductive additive has to be further increased. Thus, the effect of the present invention is remarkably exhibited. The particle diameter of the positive electrode active material is preferably 20 μm or less, more preferably 10 μm or less, still more preferably 5 μm or less. In the present description, the particle diameter means the median diameter (D50). The median diameter can be measured with a laser scattering particle size distribution analyzer (for example, Microtrac HRAX-100 manufactured by NIKKISO CO., LTD.).

Graphene in the present invention is a Structure including a laminate of single layers of graphene, and has a two-dimensional form on flakes. The thickness of graphene is not particularly limited, but is preferably 100 nm or less, more preferably 50 nm or less, still more preferably 20 nm or less. As the thickness of graphene, a value obtained in the following manner is used. A graphene dispersion liquid is diluted with NMP to 0.002% by mass, dropped on a glass substrate, and dried. Then, graphene on the substrate is observed with a laser microscope capable of measuring a three-dimensional shape, and the thickness of each graphene layer is measured. When the thickness is varied among the graphene layers, the area average of the thicknesses is obtained. In this way, the thicknesses of 50 randomly selected graphene layers are calculated, and the average thereof is taken as the thickness of graphene.

The size of graphene in the plane direction is also not particularly limited, but the lower limit is preferably 0.5 μm or more, more preferably 0.7 μm or more, still more preferably 1 μm or more, and the upper limit is preferably 50 μm or less, more preferably 10 μm or less, still more preferably 5 μm or less. The size of graphene in the plane direction as used herein means the average of the longest diameter and the shortest diameter of the graphene surface.

The specific surface area of graphene reflects the thickness of graphene and the degree of peeling of graphene. The larger the specific surface area of graphene is, the thinner graphene is, and the higher the degree of peeling is. When the specific surface area of graphene is small, that is, when the degree of peeling is low, it becomes difficult to form a conductive network of the electrode. When the specific surface area of graphene is large, that is, when the degree of peeling is high, graphene tends to aggregate, so that graphene is poorly dispersed and difficult to handle. Graphene used in the present invention preferably has a specific surface area of 80 $m^2/g$ or more, more preferably 100 $m^2/g$ or more, still more preferably 130 $m^2/g$ or more as measured by the BET measurement method. The specific surface area is preferably 250 $m^2/g$ or less, more preferably 200 $m^2/g$ or less, still more preferably 180 $m^2/g$ or less. The BET measurement method is performed according to the method described in JIS Z 8830: 2013. The measurement of the adsorption gas quantity is performed by a carrier gas method, and the analysis of the adsorption data is performed by a single point method.

Graphene used in the present invention preferably has an element ratio of oxygen to carbon (O/C ratio) of 0.08 or more and 0.30 or less as measured by X-ray photoelectron spectroscopy. If the amount of oxygen atoms on the graphene surface is too small, graphene is poorly dispersed. In addition, the bond of graphene with the silane coupling agent described later is weak, so that graphene hardly forms a bond with the positive electrode active material. Conversely, too many oxygen atoms mean a state in which graphene is not sufficiently reduced, and the π-electron conjugated structure is not restored and the electric conductivity is lowered.

The oxygen atoms on the graphene surface are derived from an oxygen atom-containing functional group having high polarity, such as a hydroxy group (—OH), a carboxyl group (—COOH), an ester bond (—C(=O)—O—), an ether bond (—C—O—C—), a carbonyl group (—C(=O)—), and an epoxy group. A surface treatment agent is sometimes added to graphene. In such a case, not only the oxygen atoms derived from the functional group of graphene itself but also the oxygen atoms derived from the functional group of the surface treatment agent are included in the "oxygen atoms on the graphene surface". That is, in graphene to which the surface treatment agent is added, the O/C ratio of the surface after the treatment with the surface treatment agent is preferably within the above-mentioned range. The O/C ratio of graphene is more preferably 0.12 or more, still more preferably 0.14 or more. The O/C ratio is more preferably 0.20 or less, still more preferably 0.17 or less.

In the X-ray photoelectron spectroscopy, a surface of a sample placed in an ultra-high vacuum is irradiated with soft X-rays, and photoelectrons emitted from the surface are detected with an analyzer. The photoelectrons are measured by wide scan, and the value of binding energy of bound electrons in the substance is obtained to acquire elemental information on the substance surface. Furthermore, the element ratio can be quantified using the peak area ratio.

The element ratio of carbon to oxygen can be controlled, for example, by changing the degree of oxidation of graphene oxide as a raw material or by changing the amount of the surface treatment agent in the case where a chemical peeling method is employed. The higher the degree of oxidation of graphene oxide is, the larger the amount of oxygen remaining after the reduction is, and the lower the degree of oxidation is, the smaller the amount of oxygen after the reduction is. As the adhesion amount of the surface treatment agent having an acidic group is larger, the amount of oxygen can be increased. As the surface treatment agent, a compound having an amino group and an acidic group is preferable, and dopamine hydrochloride is particularly preferable.

The content of graphene in the positive electrode is preferably 0.1 parts by weight or more and 5 parts by weight or less based on 100 parts by weight of the positive electrode active material. If the content is less than 0.1 parts by weight, electron conduction of the surface of the positive electrode active material tends to be deteriorated. On the other hand, if the content exceeds 5 parts by weight, graphene tends to aggregate, and a part that thickly adheres to the positive electrode active material increases, so that the ion conductivity tends to be low. The content of graphene in the positive electrode is more preferably 0.5 parts by weight or more based on 100 parts by weight of the positive electrode active material. The content is more preferably 3.0 parts by weight or less, still more preferably 1.5 parts by weight or less based on 100 parts by weight of the positive electrode active material.

The physical properties of graphene present in the positive electrode and the content of graphene are analyzed as follows. First, a battery is disassembled in an Ar glove box, and the positive electrode is washed with dimethyl carbonate and vacuum-dried in a side box of the Ar glove box for 1 hour. Then, the particle diameter of the active material and the size of graphene in the plane direction can be measured by SEM observation of a surface of the positive electrode. When the analysis by observation of the surface is difficult, the powder obtained after peeling off the mixture layer may be observed by SEM in the following manner. The mixture layer is peeled off with a spatula, the obtained powder is dissolved in N-methylpyrrolidone (NMP), and the resulting solution is filtered to separate the solution into a residue (active material, graphene, and NMP) and a filtrate (NMP and others). The obtained residue is vacuum-dried, NMP in an amount of 5-fold the weight of the residue is added again to the residue, and the active material is separated from graphene with an apparatus capable of applying a strong shear force such as FILMIX (registered trademark) model 30-30 (PRIMIX Corporation) or a wet jet mill. The resulting treated material is passed through a sieve several times, the sieve having pores of a size that allows passage of only the one having the smaller size of the following: the size of graphene in the plane direction and the particle diameter of the active material that are obtained by SEM observation. In this way, the active material is separated from graphene. Then, the obtained graphene-NMP mixture is vacuum-dried to give a graphene powder. The graphene powder thus isolated is subjected to X-ray photoelectron spectroscopy or the like for analysis of the physical properties of graphene present in the positive electrode. Further, the particles obtained by separating the active material from graphene are vacuum-dried, and the weights of the two kinds of particles are measured to obtain the weight of graphene to the weight of the active material.

In the positive electrode for a lithium ion secondary battery of the present invention, the mixture layer has a percentage of abundance of silicon composing a siloxane bond (—Si—O—Si—) in total elements of 0.4 atomic % or more as measured by X-ray photoelectron spectroscopy. The siloxane bond is a chemical bond structure included in inorganic materials such as glass and quartz, and is a chemically stable bond because it has a larger binding energy than a C—C bond or a C—O bond does. The fact that the mixture layer has a percentage of abundance of silicon composing a siloxane bond of 0.4 atomic % or more as measured by X-ray photoelectron spectroscopy suggests that the positive electrode active material and graphene are bonded to each other via the siloxane bond in the mixture layer, and this bond makes it possible to maintain high electric conductivity for a long period of time. The percentage of abundance of silicon composing a siloxane bond is more preferably 0.7 atomic % or more and 2.0 atomic % or less. If the percentage of abundance is less than 0.4 atomic %, the adhesive force between the active material and graphene tends to be weak, whereas if the percentage of abundance exceeds 2.0 atomic %, the siloxane bond tends to serve as a resistance component.

The presence of silicon composing a siloxane bond as measured by X-ray photoelectron spectroscopy can be confirmed by the fact that a peak of Binding Energy is observed between 102 eV and 103 eV in the narrow scan of X-ray photoelectron spectroscopy as shown in FIG. 1. In addition, the percentage of abundance (atomic %) of silicon composing a siloxane bond can be measured from the sum of the peak areas of all the detected elements and the peak area of silicon composing a siloxane bond.

Further, it is preferable that the mixture layer have an element ratio of silicon to carbon (Si/C ratio) of 0.010 or more and 0.030 or less as measured by X-ray photoelectron spectroscopy. If the Si/C ratio is less than 0.010, the adhesive force between the active material and graphene tends to be weak, whereas if the Si/C ratio exceeds 0.030, the siloxane bond tends to serve as a resistance component. In either case, the electron conductivity is low.

Further, it is preferable that the mixture layer have an element ratio of nitrogen to carbon (N/C ratio) of 0.020 or more and 0.050 or less as measured by X-ray photoelectron spectroscopy. If the N/C ratio is less than 0.020, the adhesive force between the active material and graphene tends to be weak, whereas if the N/C ratio exceeds 0.050, graphene tends to aggregate. In either case, the state of coating is deteriorated, and the ion conductivity is lowered.

Furthermore, in the positive electrode of the present invention, it is preferable that the mixture layer have an element ratio of lithium to carbon (Li/C ratio), which indicates the degree of exposure of the active material from graphene as a coating material, of 0.020 or more and 0.090 or less as measured by X-ray photoelectron spectroscopy. If the Li/C ratio is less than 0.020, the active material is excessively coated with graphene and the ion conductivity tends to be low, whereas if the Li/C ratio exceeds 0.090, it suggests that the active material is exposed, and the electron conductivity is low.

In the present invention, the X-ray photoelectron spectroscopy of the mixture layer may be performed on the surface of the mixture layer or on a powder or the like obtained by peeling off the mixture layer. That is, the atomic % of silicon composing a siloxane bond and the element ratios are measured values obtained by analyzing either the surface of the mixture layer or the powder obtained by peeling off the mixture layer.

The mixture layer of the positive electrode for a lithium ion secondary battery usually contains a binder. Examples of the binder contained in the mixture layer include polysaccharides such as starch, carboxymethyl cellulose, hydroxypropyl cellulose, regenerated cellulose, and diacetyl cellulose, thermoplastic resins such as polyvinyl chloride, polyvinyl pyrrolidone, polyvinyl alcohol, polyethylene, and polypropylene, fluoropolymers such as polytetrafluoroethylene (PTFE) and polyvinylidene fluoride (PVDF), polymers having rubber elasticity such as ethylene propylene diene monomer (EPDM), sulfonated EPDM, styrene butadiene rubber, butadiene rubber, and fluororubber, polyimide precursors and/or polyimide resins, polyamideimide resins, polyamide resins, polyacrylic acids, sodium polyacrylate, acrylic resins, polyacrylonitrile, and polyethers such as polyethylene oxide.

If the amount of the binder is too small, the binding strength is low, whereas if the amount is too large, the resistance increases. Therefore, the content of the binder is preferably 0.50 to 5.0% by weight, more preferably 0.75 to 1.5% by weight based on the positive electrode active material.

Further, it is preferable to combine the mixture layer with a conductive additive other than graphene. As a conductive additive other than graphene, powders and fibers of carbon materials such as graphite, carbon fibers, carbon black, acetylene black, and carbon nanofibers, metal materials such as copper, nickel, aluminum, and silver, and mixtures thereof are preferable, and acetylene black having a three-dimensional shape and carbon nanofibers having a fibrous shape are more preferable because they improve the electric conductivity of the electrode in the thickness direction.

Usually, the positive electrode for a lithium ion secondary battery includes a current collector and the above-mentioned mixture layer formed on the current collector. As the current collector, metal foil or metal mesh is preferably used, and aluminum foil is particularly preferably used.

<Method for Manufacturing Positive Electrode for Lithium Ion Secondary Battery>

The positive electrode for a lithium ion secondary battery of the present invention can be manufactured, for example, by the method for manufacturing a positive electrode for a lithium ion secondary battery of the present invention. That is, the positive electrode for a lithium ion secondary battery of the present invention can be manufactured by a manufacturing method including, in the following order, the steps of: treating a positive electrode active material for a lithium ion secondary battery with a silane coupling agent; and mixing, with graphene or graphene oxide, the positive electrode active material for a lithium ion secondary battery treated with the silane coupling agent.

The silane coupling agent is an organosilicon compound having, in one molecule, both a reactive group that is hydrolyzed into a hydroxy group and is easily chemically bonded to an inorganic material (hydrolyzable group) and a reactive group that is easily chemically bonded to an organic material (reactive functional group). As the silane coupling agent, those having an alkoxysilyl group as a hydrolyzable group, and a vinyl group, an epoxy group, or an amino group as a reactive functional group are preferably used.

As the silane coupling agent used in the present invention, one having a shortest distance between the hydrolyzable group and the reactive functional group within 10 atoms is preferable from the viewpoint that the active material and graphene or graphene oxide are more easily adhered to each other. For example, in the case of 3-aminopropyltrimethoxysilane ($H_2NC_3H_6Si(OCH_3)_3$) which will be described later as a preferable silane coupling agent, the Si atom of methoxysilane which is a hydrolyzable group and, the N atom of the amino group which is a reactive functional group are thought to be arranged at a shortest distance between them of 3 carbon atoms.

In consideration of these points, examples of the silane coupling agent preferably used in the present invention, which has a shortest distance within 10 atoms, include the following compounds.

Examples of the silane coupling agent having a vinyl group and an alkoxysilyl group include vinyltrimethoxysilane, vinyltriethoxysilane, vinyltriacetoxysilane, allyltrimethoxysilane, vinyltris(2-methoxyethoxy)silane, p-styryltrimethoxysilane, 3-acryloxypropyltrimethoxysilane, 3-methacryloxypropyltrimethoxysilane, 3-methacryloxypropyltriethoxysilane, 3-methacryloxypropylmethyldimethoxysilane, and 3-methacryloxypropylmethyldiethoxysilane.

Examples of the silane coupling agent having an epoxy group sand an alkoxysilyl group include 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, and 3-isocyanatopropyltrimethoxysilane and 3-isocyanatopropyltriethoxysilane both having an isocyanate group and an alkoxysilane.

Examples of the silane coupling agent having an amino group and an alkoxysilyl group include 3-aminopropyltrimethoxysilane, 3-aminopropyltriethoxysilane, 3-(2-aminoethyl)aminopropyltrimethoxysilane, N-(2-aminoethyl)-3-aminopropyltrimethoxysilane, and N-(2-aminoethyl)-3-aminopropylmethyldimethoxysilane. Since the silane coupling agent having an amino group and an alkoxysilyl group can easily forma strong bond with both the hydroxy group on the surface of the active material and the oxygen atom-containing functional group on the surface of graphene or graphene oxide, it is particularly preferably used.

The silane coupling agent treatment of the active material is performed by bringing the active material into contact with the silane coupling agent. In addition, it is preferable to perform heat treatment as necessary after the active material is brought into contact with the silane coupling agent. By the silane coupling agent treatment, a chemical bond including a siloxane bond is formed between the active material and the silane coupling agent. That is, the hydrolyzable group of the silane coupling agent is hydrolyzed to produce a silanol group, a relatively weak bond such as a hydrogen bond is formed between the silanol group and the hydroxy group on the surface of the active material, and then a dehydration condensation reaction occurs to form a strong siloxane bond.

In order to efficiently perform the dehydration condensation reaction, it is preferable to perform heat treatment after the active material is brought into contact with the silane coupling agent. The method of heat treatment is not particularly limited, but a dryer capable of raising the temperature to 80° C. or higher may be used. For example, after the temperature of an inert oven is raised to 80° C. or higher, the sample is charged into the inert oven and heated for about 40 minutes to cause a dehydration condensation reaction. Further, when it is desired to perform the treatment more uniformly and in a large amount, for example, a batch type rotary kiln may be used.

The method of bringing the active material into contact with the silane coupling agent is preferably a method of mixing them together. The method of mixing is not particularly limited, and may be a method of directly mixing the silane coupling agent with the active material, or a method of dissolving a silane coupling agent in a solvent such as an alcohol in advance and then mixing the resulting solution with the active material. As a device for the mixing, a device capable of applying shear force is preferable. For example, a planetary mixer, FILMIX (registered trademark) (PRIMIX Corporation), a rotation-revolution mixer, and a planetary ball mill can be mentioned. As a method other than mixing, a method of spraying a solution obtained by dissolving the silane coupling agent to the active material to bring the silane coupling agent into contact with the active material can be employed.

Then, the active material treated with the silane coupling agent is mixed with graphene or graphene oxide.

When graphene oxide is used, the degree of oxidation of graphene oxide is preferably 0.3 or more and 1.3 or less. The higher the degree of oxidation is, the better the dispersibility in a polar solvent is due to repulsion between functional groups in the polar solvent, so that graphene oxide tends to less aggregate and the active material tends to be coated thinly. Meanwhile, the degree of oxidation is more preferably 0.8 or less so that graphene oxide alone can be reduced by heating described later after the active material is coated with graphene oxide.

As a device for mixing, the same devices as those mentioned as examples of devices for mixing the active material with the silane coupling agent can be used. Mixing the mixture of the active material and the silane coupling agent with graphene or graphene oxide forms a siloxane bond between the remaining silanol group of the silane coupling agent and the hydroxy group on the surface of graphene or graphene oxide. In addition, the reactive group of the silane coupling agent forms a strong chemical bond with the oxygen atom-containing functional group on the surface of graphene or graphene oxide.

The graphene or graphene oxide before the mixing is preferably dispersed in a solvent in advance, and the solvent used in the mixing is preferably NMP and water.

In the case where a solvent is used, after the mixing, the solvent is removed by a rolling fluidized coating method by, spraying, a spray coat method, or filtration and drying to give active material particles having graphene oxide fixed on the surface.

When the mixture of the active material and the silane coupling agent is mixed with graphene oxide, the manufacturing method preferably further includes a reduction step of reducing graphene oxide after the mixing step. The conditions of reduction are preferably conditions where the active material used is not deteriorated. Under conditions where graphene is not sufficiently reduced, the π-electron conjugated structure is not restored and the electric conductivity is lowered. On the other hand, if the reducing action is too strong, the active material itself is reduced and the capacity is deteriorated.

Specific reduction conditions include reduction by heat (thermal reduction), reduction by light irradiation (photoreduction), and chemical reduction. The thermal reduction is preferably performed in the air at 180° C. or higher and 300° C. or lower, more preferably at 200° C. or higher and 250° C. or lower. In the photoreduction, when white light is applied, the light irradiation time is preferably several milliseconds to several tens of milliseconds. In the chemical reduction, the reduction treatment is preferably performed within 1 minute using, for example, hydrazine or sodium dithionite.

The amount of graphene or graphene oxide added in the positive electrode is preferably 0.1 parts by weight or more and 5 parts by weight or less based on 100 parts by weight of the positive electrode active material. If the amount is less than 0.1 parts by weight, electron conductivity of the surface of the positive electrode active material tends to be low. On the other hand, if the amount exceeds 5 parts by weight, graphene or graphene oxide tends to aggregate, and a part that thickly adheres to the positive electrode active material increases, so that the ion conductivity tends to be low. The amount of graphene or graphene oxide added in the positive electrode is more preferably 0.5 parts by weight or more and 3.0 parts by weight or less, still more preferably 0.5 parts by weight or more and 1.5 parts by weight or less based on 100 parts by weight of the positive electrode active material. When graphene or graphene oxide is added to the positive electrode active material, graphene or graphene oxide in the form of a powder may be added as it is. However, from the viewpoint of improving the dispersibility of graphene or graphene oxide, graphene or graphene oxide is preferably added in the form of a dispersion liquid.

Further, it is preferable to combine graphene with a conductive additive other than graphene. As a conductive additive other than graphene, a conductive additive having high electron conductivity is preferable. As such a conductive additive, powders and fibers of carbon materials such as graphite, carbon fibers, carbon black, acetylene black, and carbon nanofibers, metal materials such as copper, nickel, aluminum, and silver, and mixtures thereof are preferable. Acetylene black having a three-dimensional shape and carbon nanofibers having a fibrous shape are more preferable because they improve the electric conductivity of the electrode in the thickness direction.

The positive electrode for a lithium ion secondary battery of the present invention can be manufactured without any particular limitations on steps other than those described above. Typical examples of the method include a method of mixing a positive electrode active material, graphene, a silane coupling agent, and a binder and a solvent as necessary to prepare a positive electrode paste for a lithium ion secondary battery (hereinafter sometimes simply referred to as a "positive electrode paste") containing a silane coupling agent, applying the positive electrode paste to a current collector, and then drying the positive electrode paste.

As the binder, those mentioned above as the binder contained in the mixture layer may be used. Two or more kinds of the binders may be used as a mixture. If the amount of the binder is too small, the binding strength is low, whereas if the amount is too large, the resistance increases. Therefore, the content of the binder is preferably 0.50% by weight or more, more preferably 0.75% by weight or more based on the positive electrode active material. In addition, the content of the binder is preferably 5.0% by weight or less, more preferably 1.5% by weight or less based on the positive electrode active material.

As the solvent, N-methylpyrrolidone (NMP), γ-butyrolactone, water, dimethylacetamide and the like can be used. The positive electrode paste thus prepared can be applied to a current collector and then dried to produce a positive electrode for a lithium ion secondary battery. Although the main purpose of drying is to remove the solvent, formation of a siloxane bond via a dehydration condensation reaction between an unreacted silanol group of the silane coupling agent and a functional group on the surface of graphene also occurs at this stage.

<Graphene/Positive Electrode Active Material Composite Particles>

Another aspect of the present invention is graphene/positive electrode active material composite particles (hereinafter sometimes simply referred to as "composite particles"), containing a composite of a positive electrode active material for a lithium ion secondary battery with graphene, having a percentage of abundance of silicon composing a siloxane bond in total elements of 0.4 atomic % or more as measured by X-ray photoelectron spectroscopy.

The fact that 0.4 atomic % or more of silicon composing a siloxane bond is detected by X-ray photoelectron spectroscopy suggests that the positive electrode active material and graphene are bonded to each other via the siloxane bond in the composite particles. The term "composite" means that graphene is bonded to the positive electrode active material and coats the surface of the positive electrode active material.

As the positive electrode active material and graphene, the same ones as described in the description of the positive electrode for a lithium ion secondary battery can be used. The X-ray photoelectron spectroscopy is performed similarly to the case of the powder obtained by peeling off the mixture layer of the positive electrode for a lithium ion secondary battery. Preferable values of the element ratios and the like are in accordance with the description of the positive electrode for a lithium ion secondary battery.

The composite particles of the present invention may further contain a binder in order to improve the dispersion state and the state of coating at the time of production. As the binder, the same one as described in the description of the positive electrode for a lithium ion secondary battery can be used.

As an example, the composite particles of the present invention can be produced by the method for manufacturing graphene/positive electrode active material composite particles of the present invention. That is, the composite particles can be produced by a method for manufacturing graphene/positive electrode active material composite particles including, in the following order, the steps of: treating a positive electrode active material for a lithium ion secondary battery with a silane coupling agent; and making a composite of the positive electrode active material for a lithium ion secondary battery treated with the silane coupling agent with graphene or graphene oxide.

The step of treating a positive electrode active material for a lithium ion secondary battery with a silane coupling agent can be performed in exactly the same manner as described in the method for manufacturing a positive electrode for a lithium ion secondary battery. By the silane coupling agent treatment, the positive electrode active material for a lithium ion secondary battery and the silane coupling agent are bonded to each other via a siloxane bond.

Then, a composite of the positive electrode active material for a lithium ion secondary battery treated with the silane coupling agent with graphene or graphene oxide is made. The composite of the positive electrode active material for a lithium ion secondary battery with graphene or graphene oxide can be made, for example, by a dry mechanochemical method, a rolling fluidized coating method by wet spraying, a spray coat method, or filtration and drying. Although graphene to be made into a composite may be added in the form of a powder, graphene is preferably added in the form of a dispersion liquid from the viewpoint of dispersibility.

Making a composite of the positive electrode active material for a lithium ion secondary battery with graphene or graphene oxide forms a siloxane bond between the remaining silanol group of the silane coupling agent and the hydroxy group on the surface of graphene or graphene oxide. In addition, the reactive group of the silane coupling agent forms a strong chemical bond with the oxygen atom-containing functional group on the surface of graphene.

When a composite of the positive electrode active material for a lithium ion secondary battery with graphene oxide is made, the manufacturing method preferably further includes a reduction step of reducing graphene oxide. The conditions of reduction are preferably conditions where the positive electrode active material used is not deteriorated. Under conditions where graphene is not sufficiently reduced, the it-electron conjugated structure is not restored and the electric conductivity is lowered. On the other hand, if the reducing action is too strong, the positive electrode active material itself is reduced and the capacity is deteriorated. Examples of the reduction method include reduction by heat (thermal reduction), reduction by light irradiation (photoreduction), and chemical reduction.

As an example, in the case of $LiNi_{0.5}Mn_{0.3}Co_{0.2}O_2$ which is a ternary positive electrode active material, in the thermal reduction, the composite is preferably heated at 180° C. or higher and 300° C. or lower in the air, more preferably heated at 200° C. or higher and 250° C. or lower in the air. In the photoreduction, when white light is applied, the light irradiation time is preferably several milliseconds to several tens of milliseconds. In the chemical reduction, the reduction treatment is preferably performed within 1 minute using, for example, hydrazine or sodium dithionite. Reduction under the above-mentioned conditions gives graphene/positive electrode active material composite particles.

Mixing such graphene/positive electrode active material composite particles with a binder and a solvent as necessary gives a positive electrode paste for a lithium ion secondary battery. Applying the positive electrode paste to a current collector and then drying the positive electrode paste gives a positive electrode for a lithium ion secondary battery.

EXAMPLES

In the following, as a mode for carrying out the invention, the present invention will be described in detail with reference to examples. The present invention, however, is not limited by the following examples, and modifications can be made as appropriate as long as the gist of the present invention is not changed.

Measurement Example 1: Measurement of Specific Surface Area of Graphene

The specific surface area of graphene was measured with fully automatic specific surface area measurement equipment HM Model-1210 (manufactured by Macsorb). The measurement principle was the BET fluid process, (single point operation), and the degassing conditions were 100° C.×180 minutes.

Measurement Example 2: Measurement of Discharge Capacity

A produced coin cell was set in a charge-discharge test machine (TOSCAT-3100 manufactured by TOYO SYSTEM CO., LTD.), constant current charging was performed to 4.3 V (vs. Li/Li+) at a current density of 0.1 C (0.19 mA/cm$^2$), and then constant voltage charging was performed to maintain the voltage of 4.3 V. The end current of the constant voltage charging was 0.01 C. Then, the cell was discharged to 3.0 V (vs. Li/Li+) at a constant current of 0.1 C (0.19 mA/cm$^2$) to obtain the 0.1 C discharge capacity. Further, the charge current density was fixed at 1 C. (1.9 mA/cm$^2$), the same conditions as those at 0.1 C charging were employed as the other charging conditions, and the discharge capacities when the cell was discharged at discharge current densities of 1 C (1.9 mA/cm$^2$) and 5 C (9.5 mA/cm$^2$) were obtained. The ratio of the discharge capacity at 5 C to the discharge capacity at 0.1 C (5 C/0.1 C) was taken as the high output characteristics.

Measurement Example 3: X-Ray Photoelectron Measurement

The X-ray photoelectron measurement of each sample was performed with Quantera SXM (manufactured by ULVAC-PHI, Inc.). The excited X-ray was monochromatic Al Kα 1, 2 rays (1486.6 eV), the X-ray diameter was 200 μm, and the photoelectron escape angle was 45°. The O/C ratio was determined from the ratio of the area of 526 to 538 eV of O1s spectrum based on oxygen atoms (narrow scan) to the area of 282 to 296 eV of C1s spectrum based on carbon atoms (narrow scan). In addition, the Si/C ratio was determined from the ratio of the area of 100 to 107 eV of Si2p spectrum based on silicon atoms (narrow scan) to the area of 282 to 296 eV of C1s spectrum based on carbon atoms (narrow scan). The N/C ratio was determined from the ratio of the area of 396 to 406 eV of N1s spectrum based on nitrogen atoms (narrow scan) to the area of 282 to 296 eV of C1s spectrum based on carbon atoms (narrow scan). Further, the Li/C ratio was determined from the ratio of the area of 45 to 80 eV of Li1s spectrum based on lithium atoms (narrow scan) to the area of 282 to 296 eV of Cis spectrum based on carbon atoms (narrow scan).

Preparation Example 1: Preparation of Graphene Dispersion Liquid 1

Using 1500 mesh natural graphite powder (Shanghai Yifan Graphite Co., Ltd.) as raw material, 220 ml of 98% concentrated sulfuric acid, 5 g of sodium nitrate, and 30 g of potassium permanganate were charged into 10 g of the natural graphite powder in an ice bath, the resulting mixture was mechanically stirred for 1 hour, and the temperature of the liquid mixture was kept at 20° C. or lower. The liquid mixture was taken out from the ice bath, and reacted with stirring in a water bath at 35° C. for 4 hours. Then, 500 ml of ion exchanged water was added to the liquid mixture, and the resulting suspension was reacted at 90° C. for another 15 minutes. Finally, 600 ml of ion exchanged water and 50 ml of hydrogen peroxide were charged into the suspension, and the resulting mixture was reacted for 5 minutes to give a graphene oxide dispersion liquid. The graphene oxide dispersion liquid was filtered while it was hot, metal ions were washed with dilute hydrochloric acid solution, and the acid was washed with ion exchanged water. The washing was repeated until the pH reached 7 to prepare a graphene oxide gel. The elemental composition ratio of oxygen atoms to carbon atoms of the prepared graphene oxide gel was 0.53. The prepared graphene oxide gel was diluted with ion exchanged water to a concentration of 30 mg/ml, and treated with an ultrasonic washer for 30 minutes to give a uniform graphene oxide dispersion liquid.

The obtained graphene oxide dispersion liquid (20 ml) was mixed with 0.3 g of dopamine hydrochloride, and the resulting mixture was treated with FILMIX (registered trademark) model 30-30 (PRIMIX Corporation) at a rotation speed of 40 m/s (shear rate: 40000/sec) for 60 seconds. After the treatment, the graphene oxide dispersion liquid was diluted to 5 mg/ml, and 0.3 g of sodium dithionite was added to 20 ml of the dispersion liquid. The resulting mixture was reacted at a reduction reaction temperature of room temperature (40° C.) for a reduction reaction time of 1 hour, filtered, washed with water, and dried to give a graphene powder.

The specific surface area measured according to Measurement Example 1 was 180 $m^2/g$, and the O/C ratio measured according to Measurement Example 3 was 0.11. NMP was added to the obtained graphene powder, and mixed with FILMIX (model 30-30, PRIMIX Corporation) to give a graphene dispersion liquid having a solid content concentration of 2.5%.

Preparation Example 2: Preparation of Graphene Dispersion Liquid 2

A graphene powder was obtained by the method described in Preparation Example 1, and then the powder was heat-treated at 200° C. for 5 hours with an inert oven (DN411I manufactured by Yamato Scientific Co., Ltd.).

The specific surface area measured according to Measurement Example 1 was 150 $m^2/g$, and the O/C ratio measured according to Measurement Example 3 was 0.05. NMP was added to the obtained graphene powder, and mixed with FILMIX (registered trademark) model 30-30 (PRIMIX Corporation) to give a graphene dispersion liquid having a solid content concentration of 2.5%.

Preparation Example 3: Preparation of Graphene Oxide Dispersion Liquid 1

In [Preparation Example 1], the graphene oxide dispersion liquid after the surface treatment was treated with FILMIX (registered trademark) model 30-30 (PRIMIX Corporation) at a rotation speed of 40 m/s (shear rate: 40000/sec) for 60 seconds. The dispersion liquid was diluted to 5 mg/ml to give a graphene oxide dispersion liquid having a solid content concentration of 0.5%.

Example 1

To 3 g of a positive electrode active material $LiNi_{0.5}Mn_{0.3}Co_{0.2}O_2$ (a granulated body having a median diameter of 20 μm manufactured by Umicore Japan KK), 30 mg of aminopropyltriethoxysilane as a silane coupling agent (KBE-903 manufactured by Shin-Etsu Silicone) was added, and the resulting mixture was mixed with a rotation-revolution mixer (ARE-310 manufactured by THINKY CORPORATION) at a rotation speed of 2000 RPM for 5 minutes. Then, the mixture was heat-treated for 40 minutes with an inert oven (DN411I manufactured by Yamato Scientific Co., Ltd.) which had been heated to 80° C. Then, 3.6 g (90 mg in terms of the solid content) of the graphene dispersion liquid of Preparation Example 1 was added to the mixture, and mixed with a rotation-revolution mixer at a rotation speed of 2000 RPM for 5 minutes. Further, 1.875 g of an 8% polyvinylidene fluoride NMP solution (PVDF) (KF1000 manufactured by Kureha Chemical Industry Co., Ltd.) was added to the mixture, and 510 mg of NMP was further added as a solvent. The resulting mixture was mixed with a rotation-revolution mixer at a rotation speed of 2000 RPM for 5 minutes to prepare a positive electrode paste. The composition ratio of the final positive electrode paste was active material:silane coupling agent:graphene:polyvinylidene fluoride=100:1:3:5.

Figure 2:
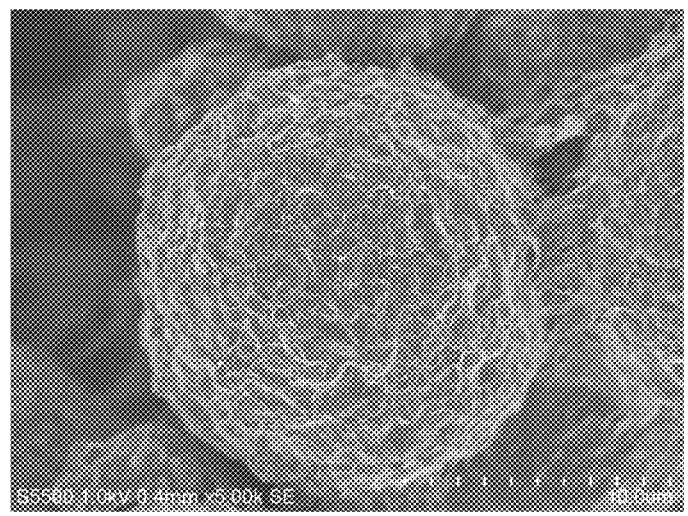
FIG. 2 is a SEM observation image of a surface of the positive electrode for a lithium ion secondary battery produced in Example 1.

Subsequently, the positive electrode paste was applied to a 20-μm thick aluminum foil piece (manufactured by Nippon Foil Mfg. Co., Ltd.) serving as a current collector with a doctor blade having a gap of 200 μm, dried at 80° C. for 30 minutes, and pressed at a pressure of 20 kg·f/$cm^2$ with a hydraulic press. Then, the positive electrode paste was punched out together with the aluminum foil piece with a punch having a diameter of 16 mm. The punched positive electrode was vacuum-dried in a glass tube oven at 120° C. for 3 hours. In the obtained positive electrode, the mixture layer had a weight of 25 mg and a thickness of 40 μm. A SEM observation image of a surface of the positive electrode is shown in FIG. 2.

After confirming that the temperature of the obtained positive electrode had dropped to room temperature, the positive electrode was transported into an Ar glove box (manufactured by MIWA MFG CO., LTD.) in a state of still being placed in the glass tube (vacuum state), and exposed to an Ar atmosphere. A coin-shaped model cell was produced using metal lithium as a counter electrode and 200 μL of $LiPF_6$/EC+DMC (LI-PASTE 1 manufactured by Tomiyama Pure Chemical Industries, Ltd.) as an electrolytic solution, and the discharge capacity and the high output characteristics were measured by the method described in Measurement Example 2.

Further, the coin-shaped model cell after the measurement was disassembled in the Ar glove box, the positive electrode was washed with dimethyl carbonate, vacuum-dried in a side box of the Ar glove box for 1 hour, and then the mixture layer was scraped off from the aluminum foil piece with a spatula. The powder of the mixture layer scraped off from the aluminum foil piece was subjected to X-ray photoelectron spectroscopy by the method described in Measurement Example 3. As a result, 0.8 atomic % of silicon composing a siloxane bond was observed. In addition, the Si/C ratio was 0.012, the N/C ratio was 0.031, and the Li/C ratio was 0.023.

Example 2

A positive electrode paste was prepared in the same manner as in Example 1 except that 1.8 g (45 mg in terms of the solid content) of the graphene dispersion liquid was added to the mixture, then 45 mg of acetylene black (manufactured by Denki Kagaku Kogyo Kabushiki Kaisha) was added to the mixture, the mixture was mixed with a rotation-revolution mixer at a rotation speed of 2000 RPM for 5 minutes, and then 1.875 g of an 8% polyvinylidene fluoride NMP solution was added to the mixture. The composition ratio of the final positive electrode paste was active material:silane coupling agent:graphene:acetylene black:polyvinylidene fluoride=100:1:1.5:1.5:5. A positive electrode and a model cell were produced in the same manner as in Example 1 except that the positive electrode paste was used.

Example 3

A positive electrode paste was prepared in the same manner as in Example 1 except that 1.8 g (45 mg in terms of the solid content) of the graphene dispersion liquid was added to the mixture, then 45 mg of VGCF (registered trademark) (manufactured by SHOWA DENKO K.K.) was added to the mixture, the mixture was mixed with a rotation-revolution mixer at a rotation speed of 2000 RPM for 5 minutes, and then 1.875 g of an 8% polyvinylidene fluoride NMP solution was added to the mixture. The composition ratio of the final positive electrode paste was active material:silane coupling agent:graphene:VGCF:polyvinylidene fluoride=100:1:1.5:1.5:5. A positive electrode and a model cell were produced in the same manner as in Example 1 except that the positive electrode paste was used.

Example 4

A positive electrode paste was prepared in the same manner as in Example 1 except that 1.8 g (45 mg in terms of the solid content) of the graphene dispersion liquid was added to the mixture, and 0.938 g of an 8% polyvinylidene fluoride NMP solution was added to the mixture. The composition ratio of the final positive electrode paste was active material:silane coupling agent:graphene:polyvinylidene fluoride=100:1:1.5:1.5. A positive electrode and a model cell were produced in the same manner as in Example 1 except that the positive electrode paste was used.

Example 5

A positive electrode paste was prepared in the same manner as in Example 1 except that the silane coupling agent used was changed to N-propyltriethoxysilane (KBE-3030 manufactured by Shin-Etsu Silicone). A positive electrode and a model cell were produced in the same manner as in Example 1 except that the positive electrode paste was used.

Example 6

A positive electrode paste was prepared in the same manner as in Example 1 except that the amount of the added graphene dispersion liquid was changed to 3.0 g (75 mg in terms of the solid content). The composition ratio of the final positive electrode paste was active material:silane coupling agent:graphene:polyvinylidene fluoride=100:1:5:5. A positive electrode and a model cell were produced in the same manner as in Example 1 except that the positive electrode paste was used.

Example 7

A positive electrode paste was prepared in the same manner as in Example 1 except that the positive electrode active material used was changed to $LiNi_{0.5}Mn_{0.3}Co_{0.2}O_2$ (a granulated body having a median diameter of 10 μm). A positive electrode and a model cell were produced in the same manner as in Example 1 except that the positive electrode paste was used.

Example 8

A positive electrode paste was prepared in the same manner as in Example 1 except that the graphene dispersion liquid of Preparation Example 2 was used instead of the graphene dispersion liquid of Preparation Example 1. A positive electrode and a model cell were produced in the same manner as in Example 1 except that the positive electrode paste was used.

Example 9

A positive electrode paste was prepared in the same manner as in Example 1 except that the positive electrode active material used was changed to $LiNi_{0.8}Co_{0.15}Al_{0.05}O_2$ (a granulated body having a median diameter of 10 μm). A positive electrode and a model cell were produced in the same manner as in Example 1 except that the positive electrode paste was used.

Example 10

A positive electrode paste was prepared in the same manner as in Example 1 except that the positive electrode active material used was changed to $LiMn_2O_4$ (having a median diameter of 5 μm) that was not a granulated body but had a spinel structure. A positive electrode and a model cell were produced in the same manner as in Example 1 except that the positive electrode paste was used.

Example 11

A positive electrode paste was prepared in the same manner as in Example 1 except that the silane coupling agent used was changed to 3-isocyanatopropyltriethoxysilane (product code 10556 manufactured by Tokyo Chemical Industry Co., Ltd.). A positive electrode and a model cell were produced in the same manner as in Example 1 except that the positive electrode paste was used.

Example 12

To 50 g of a positive electrode active material $LiNi_{0.5}Mn_{0.3}Co_{0.2}O_2$ (a granulated body having a median diameter of 20 μm manufactured by Umicore Japan KK), 0.5 g of aminopropyltriethoxysilane as a silane coupling agent (KBE-903 manufactured by Shin-Etsu Silicone) was added, and the resulting mixture was mixed with a rotation-revolution mixer (ARE-310 manufactured by THINKY CORPORATION) at a rotation speed of 2000 RPM for 5 minutes. Then, the mixture was heat-treated for 40 minutes with an inert oven (DN411I manufactured by Yamato Scientific Co., Ltd.) which had been heated to 80° C. Then, 300 g (1.5 g in terms of the solid content) of the graphene oxide dispersion liquid of Preparation Example 3 was added to the mixture, and the mixture was treated with FILMIX (registered trademark) model 30-30 (PRIMIX Corporation) at a rotation speed of 40 m/s (shear rate: 40000/sec) for 60 seconds. The obtained slurry was made into a composite with a spray dryer (MDL-015MGC manufactured by Fujisaki Electric Co., Ltd.) to give graphene oxide/positive electrode active material composite particles. The spray dryer had a nozzle gas pressure of 0.5 MPa, a liquid feed rate of 10 g/min, an inlet temperature of 250° C., and an outlet temperature of 160° C.

The obtained graphene oxide/positive electrode active material composite particles were heated in the air at a temperature of 300° C. for 5 hours to reduce graphene oxide (thermal reduction), whereby graphene/positive electrode active material composite particles were produced. The obtained graphene/positive electrode active material composite particles were subjected to X-ray photoelectron spectroscopy by the method described in Measurement Example 3. Then, 1.875 g of an 8% polyvinylidene fluoride NMP solution (PVDF) (KF1000 manufactured by Kureha Chemical Industry Co., Ltd.) was added to 3.12 g of the graphene/positive electrode active material composite particles, and 510 mg of NMP was further added as a solvent. The resulting mixture was mixed with a rotation-revolution mixer at a rotation speed of 2000 RPM for 5 minutes to prepare a positive electrode paste. The composition ratio of the final positive electrode paste was active material:silane coupling agent:graphene:polyvinylidene fluoride=100:1:3:5. A model cell was produced in the same manner as in Example 1 using the positive electrode paste.

Example 13

A positive electrode paste was prepared in the same manner as in Example 12 except that the graphene/positive electrode active material composite particles were prepared by heating the graphene oxide/positive electrode active material composite particles in the air at a temperature of 250° C. for 5 hours in Example 12. A positive electrode and a model cell were produced in the same manner as in Example 12 except that the positive electrode paste was used.

Example 14

A positive electrode paste was prepared in the same manner as in Example 12 except that graphene/positive electrode active material composite particles were prepared by irradiating the graphene oxide/positive electrode active material composite particles with 950 mJ/cm$^2$ of white pulse light for 3000 microseconds to reduce (photoreduce) graphene oxide. A positive electrode and a model cell were produced in the same manner as, in Example 12 except that the positive electrode paste was used.

Example 15

To 50 g of a positive electrode active material $LiNi_{0.5}Mn_{0.3}Co_{0.2}O_2$ (a granulated body having a median diameter of 20 μm manufactured by Umicore Japan KK), 0.5 g of aminopropyltriethoxysilane as a silane coupling agent (KBE-903 manufactured by Shin-Etsu Silicone) was added, and the resulting mixture was mixed with a rotation-revolution mixer (ARE-310 manufactured by THINKY CORPORATION) at a rotation speed of 2000 RPM for 5 minutes. Then, the mixture was heat-treated for 40 minutes with an inert oven (DN411I manufactured by Yamato Scientific Co., Ltd.) which had been heated to 80° C. Then, 60 g (1.5 g in terms of the solid content) of the graphene dispersion liquid of Preparation Example 1 was added to the mixture, and mixed with a rotation-revolution mixer at a rotation speed of 2000 RPM for 5 minutes. Then, 50 g of NMP was further added, and the resulting mixture was treated with FILMIX (registered trademark) model 30-30 (PRIMIX Corporation) at a rotation speed of 40 m/s (shear rate: 40000/sec) for 60 seconds. The obtained slurry was made into a composite with a spray dryer (MDL-015MGC manufactured by Fujisaki Electric Co., Ltd.) to give graphene/positive electrode active material composite particles. The spray dryer had a nozzle gas pressure of 0.5 MPa, a liquid feed rate of 10 g/min, an inlet temperature of 250° C., and an outlet temperature of 160° C.

The obtained graphene/positive electrode active material composite particles were subjected to X-ray photoelectron spectroscopy by the method described in Measurement Example 3. Then, 1.875 g of an 8% polyvinylidene fluoride NMP solution (PVDF) (KF1000 manufactured by Kureha Chemical Industry Co., Ltd.) was added to 3.12 g of the graphene/positive electrode active material composite particles, and 510 mg of NMP was further added as a solvent. The resulting mixture was mixed with a rotation-revolution mixer at a rotation speed of 2000 RPM for 5 minutes to prepare a positive electrode paste. The composition ratio of the final positive electrode paste was active material:silane coupling agent:graphene:polyvinylidene fluoride=100:1:3:5. A model cell was produced in the same manner as in Example 1 using the positive electrode paste.

Comparative Example 1

Figure 3:
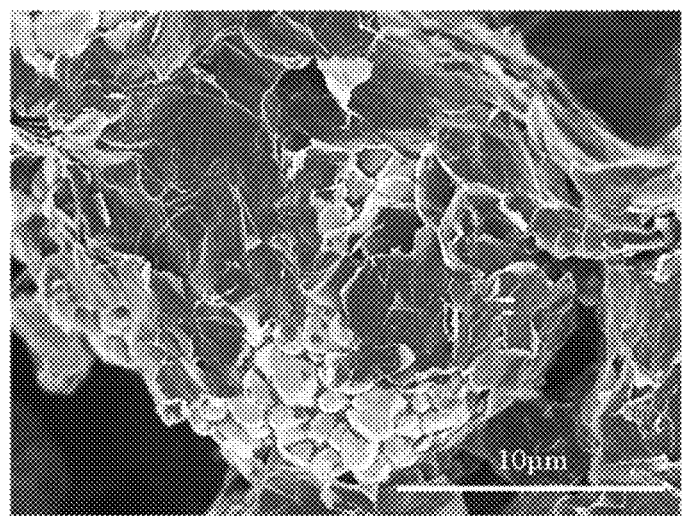
FIG. 3 is a SEM observation image of a surface of a positive electrode for a lithium ion secondary battery produced in Comparative Example 1.

A positive electrode paste was prepared in the same manner as in Example 1 except that aminopropyltriethoxysilane was not added. The composition ratio of the final positive electrode paste was active material:graphene:polyvinylidene fluoride=100:3:5. A positive electrode and a model cell were produced in the same manner as in Example 1 except that the positive electrode paste was used. A SEM observation image of a surface of the obtained positive electrode is shown in FIG. 3.

Comparative Example 2

A positive electrode paste was prepared in the same manner as in Example 1 except that the amount of aminopropyltriethoxysilane added was changed to 0.2% by weight. The composition ratio of the final positive electrode paste was active material:silane coupling agent:graphene:polyvinylidene fluoride=100:0.2:3:5. A model cell was produced in the same manner as in Example 1 using the positive electrode paste.

Comparative Example 3

A positive electrode paste was prepared in the same manner as in Example 1 except that graphene was changed to acetylene black. The composition ratio of the final positive electrode paste was active material:silane coupling agent:acetylene black:polyvinylidene fluoride=100:1:3:5. A model cell was produced in the same manner as in Example 1 using the positive electrode paste.

Comparative Example 4

A positive electrode paste was prepared in the same manner as in Example 1 except that N-octylamine (product code 00045 manufactured by Tokyo Chemical Industry Co., Ltd.) was used instead of aminopropyltriethoxysilane as the silane coupling agent. The composition ratio of the final positive electrode paste was active material:N-octylamine:graphene:polyvinylidene fluoride=100:1:3:5. A model cell was produced in the same manner as in Example 1 using the positive electrode paste.

Comparative Example 5

A positive electrode paste was prepared in the same manner as in Example 1 except that the positive electrode active material used was changed to $LiNi_{0.5}Mn_{0.3}Co_{0.2}O_2$ (a granulated body having a median diameter of 10 μm), and graphene was changed to acetylene black. A positive electrode and a model cell were produced in the same manner as in Example 1 except that the positive electrode paste was used.

Comparative Example 6

A positive electrode paste was prepared in the same manner as in Example 1 except that the positive electrode active material used was changed to $LiNi_{0.8}Co_{0.15}Al_{0.05}O_2$ (a granulated body having a median diameter of 10 μm), and graphene was changed to acetylene black. A positive electrode and a model cell were produced in the same manner as in Example 1 except that the positive electrode paste was used.

Comparative Example 7

A positive electrode paste was prepared in the same manner as in Example 1 except that the positive electrode active material used was changed to $LiMn_2O_4$ (having a median diameter of 5 μm) that was not a granulated body but had a spinel structure, and graphene was changed to acetylene black. A positive electrode and a model cell were produced in the same manner as in Example 1 except that the positive electrode paste was used.

Comparative Example 8

Composite particles were prepared and then a positive electrode paste was prepared in the same manner as in Example 12 except that the graphene dispersion liquid was changed to acetylene black at the time of preparation of the slurry before the production of the granulated body, and the amount of added NMP was changed to 100 g in Example 12.

A positive electrode and a model cell were produced in the same manner as in Example 12 except that the positive electrode paste was used.

The results of X-ray photoelectron spectroscopy of the positive electrode or composite particles produced in the examples and comparative examples, and the discharge capacity of the model cells are shown in Table 1. Incidentally, the atomic percentages of Si composing the siloxane bond in the positive electrodes of Comparative Examples 1 and 4 were below the detection limit of the apparatus.

TABLE 1

|  | Atomic % of Si composing siloxane bond | Element ratio (%) to carbon | | | Discharge capacity (mAh/g) | | | High output characteristics |
|---|---|---|---|---|---|---|---|---|
|  |  | Si/C | N/C | Li/C | 0.1 C | 1 C | 5 C | (5 C/0.1 C) |
| Example 1 | 0.8 | 0.012 | 0.031 | 0.023 | 166 | 148 | 109 | 0.66 |
| Example 2 | 1.2 | 0.017 | 0.029 | 0.029 | 170 | 155 | 130 | 0.76 |
| Example 3 | 1.1 | 0.017 | 0.031 | 0.046 | 171 | 159 | 135 | 0.79 |
| Example 4 | 1.3 | 0.030 | 0.050 | 0.076 | 167 | 150 | 127 | 0.76 |
| Example 5 | 1.0 | 0.015 | 0.010 | 0.025 | 164 | 130 | 90 | 0.55 |
| Example 6 | 0.8 | 0.009 | 0.020 | 0.010 | 163 | 135 | 92 | 0.56 |
| Example 7 | 0.8 | 0.012 | 0.029 | 0.022 | 173 | 160 | 145 | 0.84 |
| Example 8 | 0.6 | 0.009 | 0.029 | 0.029 | 164 | 136 | 93 | 0.57 |
| Example 9 | 1.0 | 0.015 | 0.030 | 0.024 | 186 | 170 | 145 | 0.78 |
| Example 10 | 0.4 | 0.006 | 0.029 | 0.022 | 110 | 87 | 60 | 0.55 |
| Example 11 | 0.7 | 0.010 | 0.028 | 0.027 | 165 | 140 | 98 | 0.59 |
| Example 12 | 0.9 | 0.012 | 0.026 | 0.022 | 158 | 142 | 102 | 0.61 |
|  | (0.013) | (0.029) | (0.025) |  |  |  |  |  |
| Example 13 | 0.7 | 0.010 | 0.026 | 0.021 | 157 | 145 | 107 | 0.64 |
| Example 14 | 0.8 | 0.013 | 0.029 | 0.032 | 155 | 143 | 105 | 0.63 |
| Example 15 | 0.8 | 0.013 | 0.036 | 0.038 | 170 | 155 | 130 | 0.76 |
|  | (0.9) | (0.016) | (0.041) | (0.043) |  |  |  |  |
| Comparative Example 1 | — | — | 0.015 | 0.104 | 100 | 50 | 30 | 0.30 |
| Comparative Example 2 | 0.2 | 0.005 | 0.018 | 0.018 | 105 | 53 | 35 | 0.33 |
| Comparative Example 3 | 0.3 | 0.004 | 0.019 | 0.014 | 168 | 103 | 39 | 0.23 |
| Comparative Example 4 | — | — | 0.060 | 0.011 | 97 | 45 | 23 | 0.24 |
| Comparative Example 5 | 0.3 | 0.004 | 0.010 | 0.019 | 168 | 102 | 58 | 0.35 |
| Comparative Example 6 | 0.2 | 0.003 | 0.011 | 0.018 | 185 | 110 | 60 | 0.32 |
| Comparative Example 7 | 0.3 | 0.005 | 0.011 | 0.017 | 108 | 78 | 50 | 0.46 |
| Comparative Example 8 | 0.2 | 0.003 | 0.008 | 0.014 | 168 | 105 | 40 | 0.24 |
|  | (0.3) | (0.004) | (0.009) | (0.016) |  |  |  |  |

*Values in parentheses are measured values of composite particles.
*"—" means that the value is below the detection limit.

The invention claimed is:

1. A positive electrode for a lithium ion secondary battery, comprising a mixture layer containing a positive electrode active material for a lithium ion secondary battery and graphene, wherein the mixture layer has a percentage of abundance of silicon composing a siloxane bond in total elements of 0.4 atomic % or more as measured by X-ray photoelectron spectroscopy,
   wherein the mixture layer has an element ratio of silicon to carbon (Si/C ratio) of 0.010 or more and 0.030 or less as measured by X-ray photoelectron spectroscopy,
   wherein the positive electrode active material for a lithium ion secondary battery contains at least lithium and nickel,
   wherein the positive electrode active material for a lithium ion secondary battery is treated with a silane coupling agent, and
   wherein the silane coupling agent is a compound having an amino group and an alkoxysilyl group.

2. The positive electrode for a lithium ion secondary battery according to claim 1, wherein the mixture layer has an element ratio of nitrogen to carbon (N/C ratio) of 0.020 or more and 0.050 or less as measured by X-ray photoelectron spectroscopy.

3. The positive electrode for a lithium ion secondary battery according to claim 1, wherein the mixture layer has an element ratio of lithium to carbon (Li/C ratio) of 0.020 or more and 0.090 or less as measured by X-ray photoelectron spectroscopy.

4. The positive electrode for a lithium ion secondary battery according to claim 1, wherein the positive electrode active material for a lithium ion secondary battery is a granulated body.

5. The positive electrode for a lithium ion secondary battery according to claim 1, wherein the positive electrode active material for a lithium ion secondary battery has a particle diameter of 20 μm or less.

6. The positive electrode for a lithium ion secondary battery according to claim 1, wherein the mixture layer further contains at least one of acetylene black or carbon nanofibers.

7. A method for manufacturing a positive electrode for a lithium ion secondary battery of claim 1, comprising, in the following order, the steps of:
    treating a positive electrode active material for a lithium ion secondary battery with a silane coupling agent by directly mixing the silane coupling agent with the positive electrode active material, wherein the positive electrode active material for a lithium ion secondary battery contains at least lithium and nickel; and
    mixing, with graphene or graphene oxide, the positive electrode active material for a lithium ion secondary battery treated with the silane coupling agent.

8. The manufacturing method according to claim 7, further comprising, after the step of mixing, with the graphene oxide, the positive electrode active material for a lithium ion secondary battery treated with the silane coupling agent, a reduction step of reducing the graphene oxide.

9. The manufacturing method according to claim 7, wherein the silane coupling agent is a compound having an amino group and an alkoxysilyl group.

10. Graphene/positive electrode active material composite particles, comprising a composite of a positive electrode active material for a lithium ion secondary battery with graphene, having a percentage of abundance of silicon composing a siloxane bond in total elements of 0.4 atomic % or more as measured by X-ray photoelectron spectroscopy,
    wherein the composite has an element ratio of silicon to carbon (Si/C ratio) of 0.010 or more and 0.030 or less as measured by X-ray photoelectron spectroscopy,
    wherein the positive electrode active material for a lithium ion secondary battery contains at least lithium and nickel,
    wherein the positive electrode active material for a lithium ion secondary battery is treated with a silane coupling agent, and
    wherein the silane coupling agent is a compound having an amino group and an alkoxysilyl group.

11. A method for manufacturing graphene/positive electrode active material composite particles, comprising, in the following order, the steps of:
    treating a positive electrode active material for a lithium ion secondary battery with a silane coupling agent by directly mixing the silane coupling agent with the positive electrode active material, wherein the silane coupling agent is a compound having an amino group and an alkoxysilyl group and wherein the positive electrode active material for a lithium ion secondary battery contains at least lithium and nickel; and
    making a composite of the positive electrode active material for a lithium ion secondary battery treated with the silane coupling agent with graphene or graphene oxide, wherein the composite has a percentage of abundance of silicon composing a siloxane bond in total elements of 0.4 atomic % or more as measured by X-ray photoelectron spectroscopy, and
    wherein the composite has an element ratio of silicon to carbon (Si/C ratio) of 0.010 or more and 0.030 or less as measured by X-ray photoelectron spectroscopy.

12. The manufacturing method according to claim 11, further comprising, after the step of making a composite of the positive electrode active material for a lithium ion secondary battery treated with the silane coupling agent with the graphene oxide, a reduction step of reducing the graphene oxide.

13. A positive electrode paste for a lithium ion secondary battery, comprising: a positive electrode active material for a lithium ion secondary battery, graphene or graphene oxide, and a silane coupling agent,
    wherein the positive electrode paste has a percentage of abundance of silicon composing a siloxane bond in total elements of 0.4 atomic % or more as measured by X-ray photoelectron spectroscopy,
    wherein the positive electrode paste has an element ratio of silicon to carbon
    (Si/C ratio) of 0.010 or more and 0.030 or less as measured by X-ray photoelectron spectroscopy,
    wherein the positive electrode active material for a lithium ion secondary battery contains at least lithium and nickel, and
    wherein the silane coupling agent is a compound having an amino group and an alkoxysilyl group.

14. A positive electrode paste for a lithium ion secondary battery, comprising the graphene/positive electrode active material composite particles according to claim 10.

15. A positive electrode for a lithium ion secondary battery, comprising the graphene/positive electrode active material composite particles according to claim 10.

* * * * *